(12) United States Patent
Morehead

(10) Patent No.: US 8,033,046 B2
(45) Date of Patent: Oct. 11, 2011

(54) FISHING ROD HOLDER

(76) Inventor: Robert I. Morehead, Independence, KY (US)

( * ) Notice: Subject to any disclaimer, the term of this patent is extended or adjusted under 35 U.S.C. 154(b) by 476 days.

(21) Appl. No.: 12/232,672

(22) Filed: Sep. 22, 2008

(65) Prior Publication Data

US 2010/0071250 A1   Mar. 25, 2010

(51) Int. Cl.
*A01K 97/10* (2006.01)
(52) U.S. Cl. ........................................ 43/21.2; 248/535
(58) Field of Classification Search ................ 43/21.2; 248/535, 538
See application file for complete search history.

(56) References Cited

U.S. PATENT DOCUMENTS

| | | | |
|---|---|---|---|
| 3,000,599 A | 9/1961 | Honig | |
| 3,628,759 A | 12/1971 | Knedlik | |
| 3,874,107 A | 4/1975 | Wheaton | |
| 4,641,453 A * | 2/1987 | Roberts, Sr. | 43/17 |
| 5,009,027 A | 4/1991 | Lee | |
| 5,184,797 A * | 2/1993 | Hurner | 248/538 |
| 6,050,020 A | 4/2000 | Sizemore | |
| 6,088,946 A * | 7/2000 | Simmons | 43/15 |
| 6,089,524 A * | 7/2000 | Lai | 248/535 |
| 6,318,018 B1 * | 11/2001 | Weaver | 43/21.2 |
| 6,381,897 B1 * | 5/2002 | Walsh | 43/21.2 |
| 6,646,557 B2 * | 11/2003 | Brake | 340/573.2 |
| 7,232,099 B1 * | 6/2007 | Wilcox | 248/228.1 |
| 7,686,276 B1 * | 3/2010 | McCauley | 248/535 |
| 2007/0089351 A1 * | 4/2007 | Higgins | 43/21.2 |

* cited by examiner

*Primary Examiner* — Christopher P Ellis
(74) *Attorney, Agent, or Firm* — Richard C. Litman

(57) ABSTRACT

The fishing rod holder comprises a support post having a threaded end that can be mounted to a base, such as the side of a boat or the rail of a pier. Alternatively, the end of the support post can be fashioned to terminate in a sharp point for insertion into the ground. The support post is attached to the bottom surface of horizontally adjustable, semicylindrical plates. A socket member is pivotally attached to the plates. The socket member is adapted to receive the grip of a fishing rod therein. The semicylindrical plates can be pivoted on the support post to adjust the angle of the rod while fishing, and the socket can be pivoted up from the plates for quickly removing the rod from the holder when a fish is hooked. The plates can be adjusted to different lengths to support different rod and reel combinations.

11 Claims, 3 Drawing Sheets

FISHING ROD HOLDER

BACKGROUND OF THE INVENTION

1. Field of the Invention

The present invention generally relates to fishing gear, and more specifically, to a fishing rod holder for supporting a fishing rod in various positions.

2. Description of the Related Art

In many instances, fishermen may leave their rods unattended while fishing from a boat, pier or bank. At such times, it is desirable that the rod is positioned at a pre-determined angle while waiting for a fish to bite. It is also desirable to be able to move the rod closer to or farther from the side of the boat or edge of the pier or bank. An easy-to-use, efficient mount for holding a fishing rod in a pre-determined position and allowing horizontal movement of the same would certainly be a welcome addition for fishermen of all skill levels. Thus, a fishing rod holder solving the aforementioned problems is desired.

SUMMARY OF THE INVENTION

The fishing rod holder comprises a support post having a threaded end that can be mounted to a base, such as the side of a boat or the rail of a pier. Alternatively, the end of the support post can be fashioned to terminate in a sharp point for insertion into the ground. The support post is attached to the bottom surface of horizontally adjustable, semicylindrical plates. A socket member is pivotally attached to the plates. The socket member is adapted to receive the grip of a fishing rod therein. The semicylindrical plates can be pivoted on the support post to adjust the angle of the rod while fishing, and the socket can be pivoted up from the plates for quickly removing the rod from the holder when a fish is hooked. The plates can be adjusted to different lengths to support different rod and reel combinations.

Accordingly, the invention presents a device that allows a fisherman to leave the rod unattended, but in an optimum angular position while waiting for a bite. The rod can be quickly removed from the holder once a fish is on the line. Versatile and easy-to use, the device is fabricated from suitable, durable, rust-resistant materials. The invention provides for improved elements thereof in an arrangement for the purposes described that are inexpensive, dependable and fully effective in accomplishing their intended purposes.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
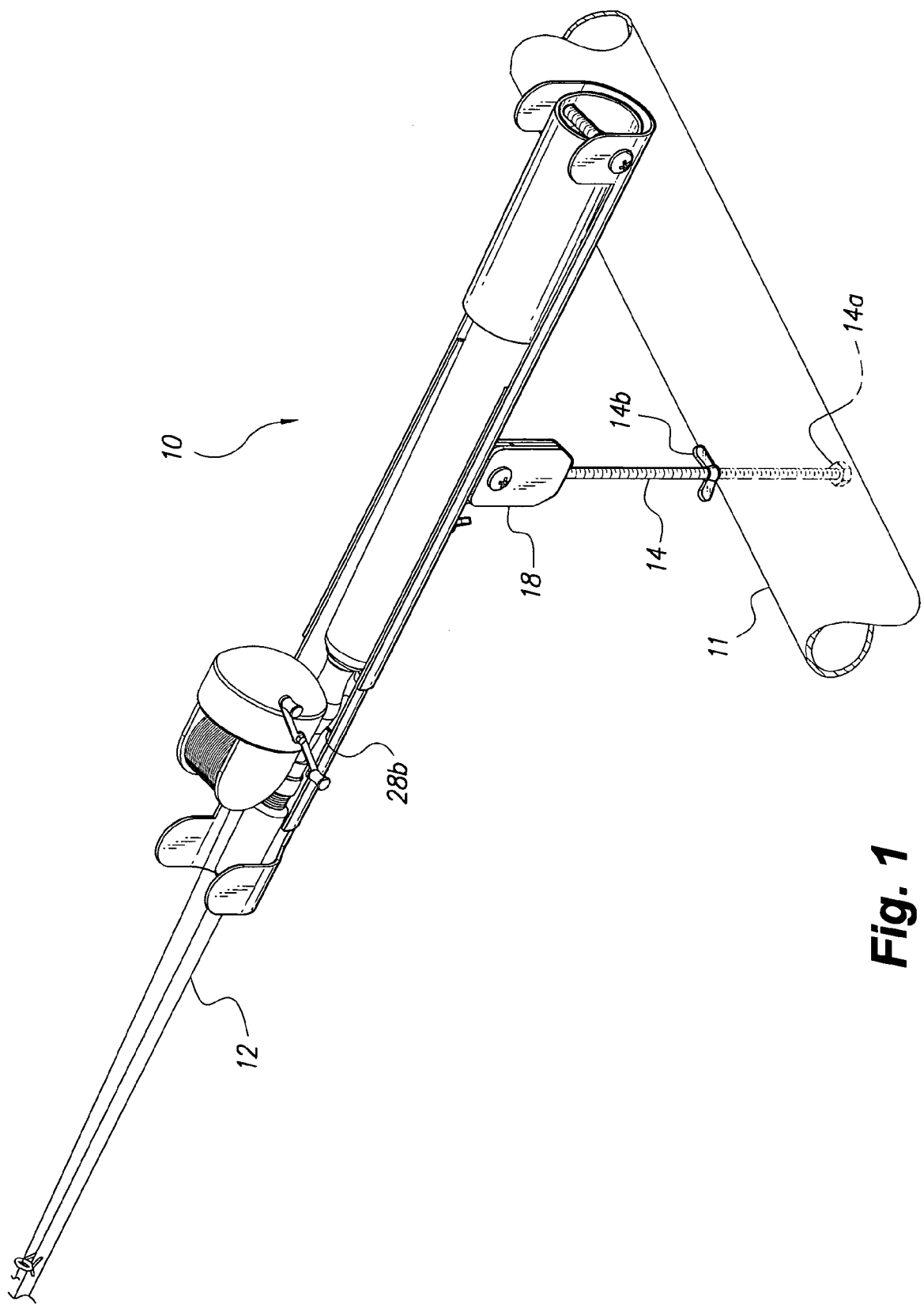
FIG. 1 is an environmental, perspective view of a fishing rod holder according to the present invention.

Attention is first directed to FIG. 1, wherein an exemplary fishing rod holder is generally indicated at 10. As illustrated, holder 10 is mounted on a rail 11 with a fishing rod 12 supported on holder 10. It will be understood that the fishing rod holder 10 may be mounted on any suitable support, including a deck, a rail, a custom rod holder mount, or even staked into the ground.

Figure 2:
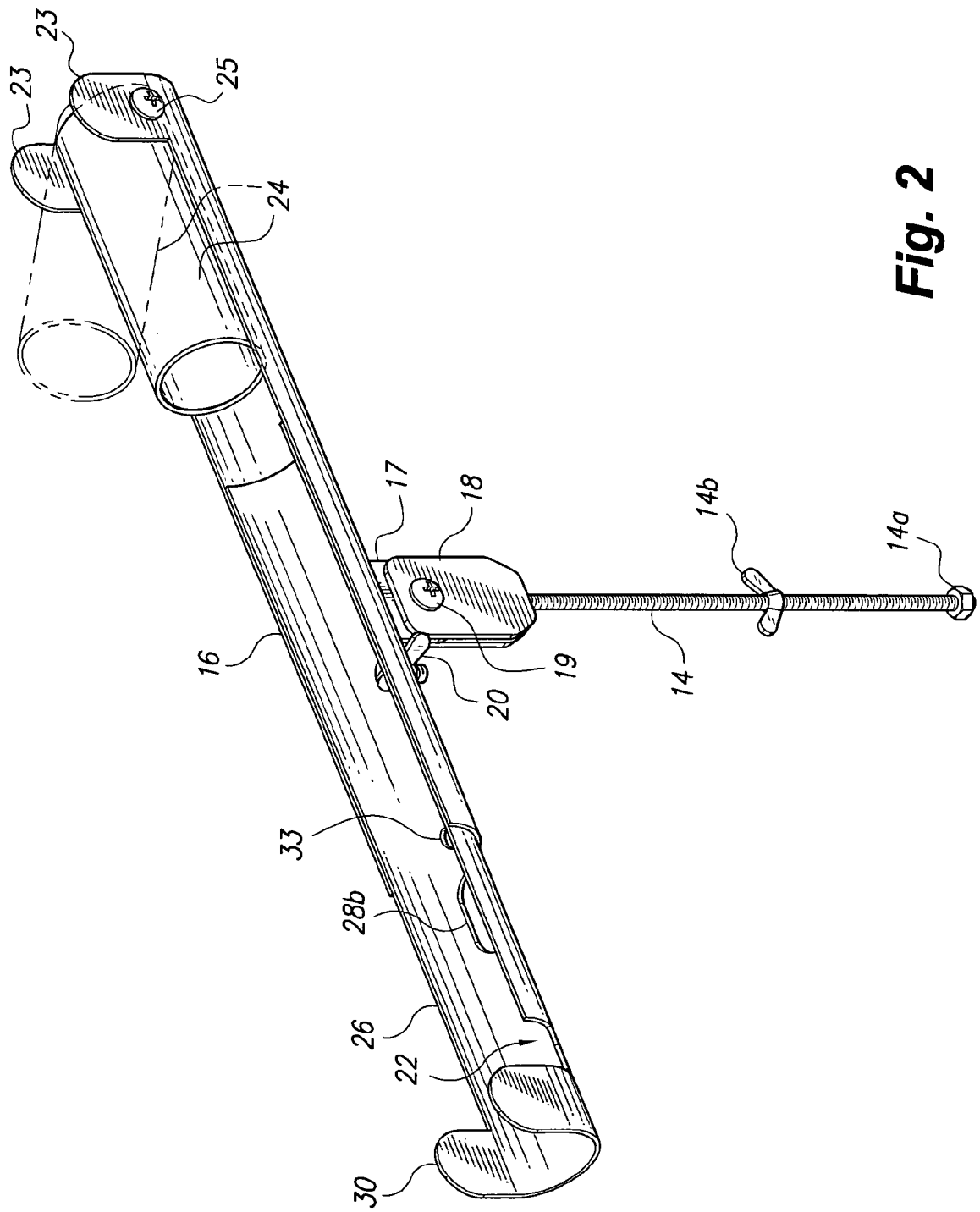
FIG. 2 is a perspective view of a fishing rod holder according to the present invention.
Figure 3:
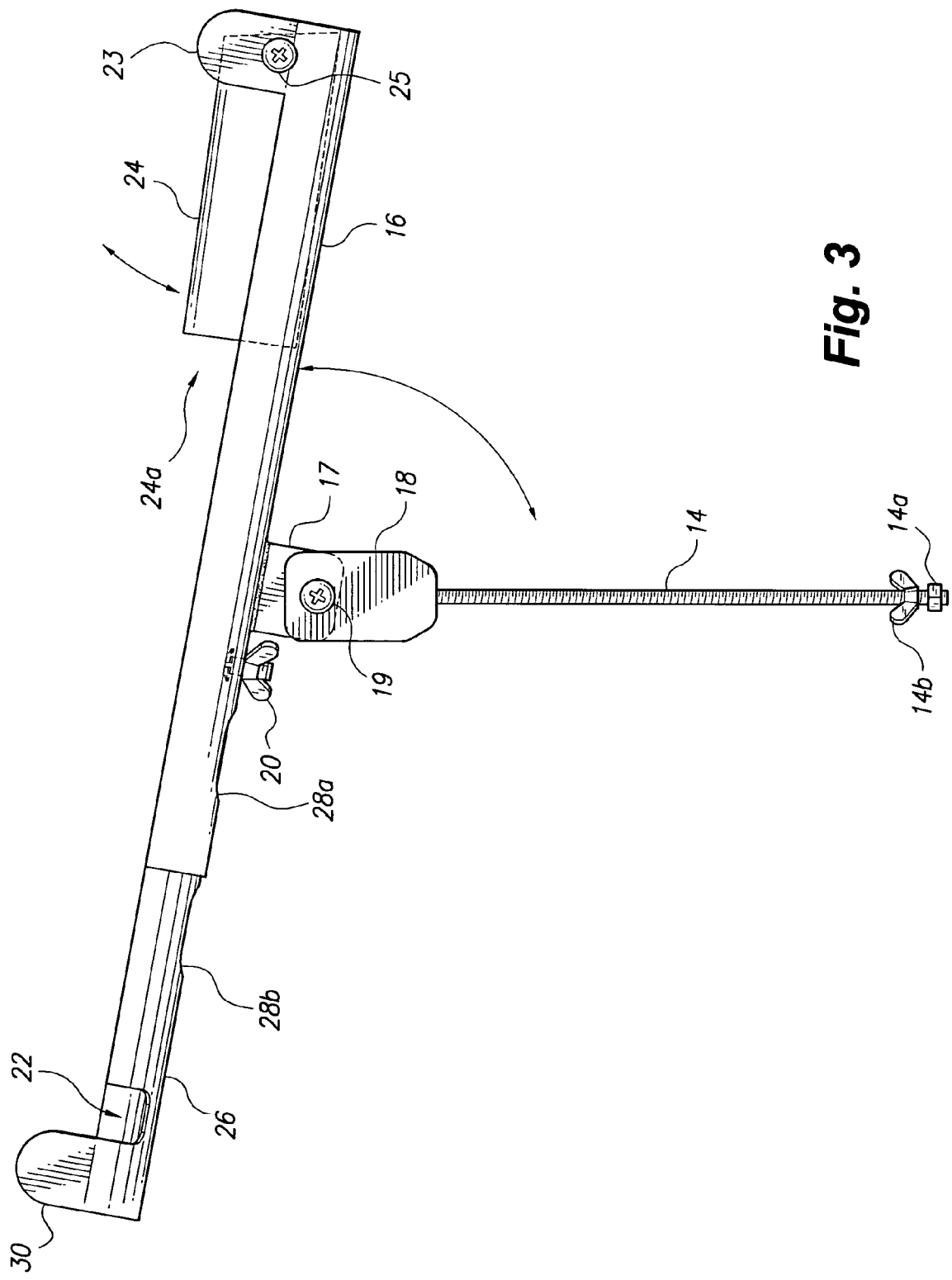
FIG. 3 is a side view of a fishing rod holder according to the present invention.

As best seen in FIGS. 1-3, rod holder 10 comprises a support post 14. Post 14 is preferably a threaded rod, although a stake with a pointed tip end may be substituted for the threaded rod if the rod holder 10 is only to be used when staked into the ground or in similar media. A hex nut 14a and a wing nut 14b may be threaded onto the lower end of the threaded rod below and above the rail 11 or other support for the rod holder 10. The upper end of the threaded rod has a clevis 18 attached thereto, e.g., by welding.

As shown in FIGS. 2 and 3, elongated semicircular plates 16 and 26 are pivotally mounted on threaded rod 14. By semicylindrical, it is meant that plates 16 and 26 are arcuate in transverse section, describing an arc between 90° and 180°. Lower plate 16 has a flange 17 extending from its bottom surface that fits between the fork defined by clevis 18, and which is pivotally attached thereto by bolt 19, which serves as a pivot pin. Upper plate 26 is removably attached to lower plate 16, e.g., by a screw and wing nut assembly 20 placed through aligned holes in the plates 16 and 26, so that the combined length of plates 16 and 26 can be adjusted to support different rod and reel combinations, as described below. When joined together, the plates 16 and 26 form a cradle that supports the portion of the fishing rod 12 that extends from the grip through the reel or reel seat.

Lower plate 16 has a pair of parallel ears 23 extending upward from the rear end of the plate 16. A bolt or pivot pin 25 extends through the ears 23 and the base of a cylindrical socket 24 to pivotally attach the socket 24 to the rear end of lower plate 16. Socket 24 has a diameter large enough to receive the grip of most conventional fishing rods, the pivot pin 25 serving as a stop to prevent the grip of the fishing rod from sliding out the base of the socket 24.

Upper plate 26 has a pair of parallel ears 30 extending upward from the forward end of the plate 26. A notch 22 is formed on one side of upper plate 26 adjacent one of the ears 30. Notch 22 is dimensioned and configured to receive the frame of a spin-casting reel, which generally extends below the rod.

As shown in FIGS. 2 and 3, both the upper and lower plates 26 and 16 have a generally oval slot defined therein, the slot 28a in the lower plate 16 being adjacent the forward end of the plate 16, the slot 28b in the upper plate 26 being a little more than one inch rearward of notch 22. Lower plate 16 has a single screw hole defined therein between slot 28a and flange 17. Upper plate 26 has a pair of screw holes defined therein, one screw hole 33 being positioned just rearward of slot 28b, the other being positioned towards the rear end of upper plate 26.

The combined length of upper plate 26 and lower plate 16 is adjusted by aligning either the forward screw hole 33 with the screw hole in lower plate 16 and securing the two plates 26 and 16 together by inserting fastener assembly 20 through the aligned holes, or by aligning the rearward screw hole in upper plate 26 with the screw hole in lower plate 16 and inserting fastener assembly 20 through the aligned holes to secure the two plates together, as shown in FIGS. 2 and 3. In the former case, slots 28a and 28b are aligned with each other so that the trigger of a pistol grip fishing rod, e.g., a bait-casting rod, can extend through the aligned slots 28a and 28b. In the latter case, the fishing rod holder 10 can accommodate a longer fishing rod, the trigger passing through slot 28b in the upper plate 26 only.

In use, the combined length of plates 26 and 16 is adjusted to support the grip and reel mount portions of the fishing rod 12, the length of the cradle depending upon whether the rod is a bait-casting rod, spin-casting rod, or fly-casting rod. The threaded rod 14 is attached to a suitable support, and the angle of the plates 16 and 26 is adjusted by loosening pivot 19, pivoting the plates, and tightening pivot 19. The rod is cast, the grip of the fishing rod is inserted into socket 24, and the handle and reel of the rod 12 are supported on plates 16 and 26, ears 23 and 30 ensuring that the rod 12 is not displaced laterally. When a fish is hooked, the socket 24 may be pivoted upward, as shown in FIG. 2, and the grip of the rod can be quickly and slidably removed from the socket 24 to reel the fish in.

It is to be understood that the present invention is not limited to the embodiment described above, but encompasses any and all embodiments within the scope of the following claims.

I claim:

1. A fishing rod holder, comprising:
   a support post having an upper end and a lower end;
   at least one elongated, semicylindrical plate member having an upper surface and a lower surface, the upper end of the post member being pivotally attached to the plate member, wherein said at least one plate member comprises two plate members removably attached to each other, one of the plate members having mutually exclusive forward and rearward locations so that the two plates form an adjustable length cradle for supporting the grip and reel end of a fishing rod;
   a socket member mounted on the plate member, the socket member being pivotally attached to the plate member, the socket being dimensioned and configured for slidably receiving a fishing rod grip.

2. The fishing rod holder according to claim 1, wherein said support post is attached to the lower surface of said plate member.

3. The fishing rod holder according to claim 1, wherein said socket member is mounted to the upper surface of said plate member.

4. The fishing rod holder according to claim 1, wherein said support post is threaded adjacent the lower end.

5. A fishing rod holder, comprising:
   a support post having an upper end and a lower end;
   a lower plate member having an upper surface and a lower surface, the upper end of the post member being pivotally attached to the lower surface of the lower plate member;
   an upper plate member disposed above the upper surface of the lower plate member, the upper plate member being slidably adjustable relative to the lower plate member, the upper and lower plate members being semicylindrical; and
   a socket member pivotally mounted on the lower plate member.

6. The fishing rod holder according to claim 5, wherein said socket member is mounted to the upper surface of said lower plate member.

7. The fishing rod holder according to claim 5, wherein said support post is threaded adjacent the lower end.

8. The fishing rod holder according to claim 5, wherein said plate members have slots defined therein for extending a trigger of a pistol grip fishing rod handle therethrough.

9. A fishing rod holder, comprising:
   a threaded support post having an upper end, a lower end, a clevis mounted on the upper end, and threaded fasteners disposed on the lower end adapted for clamping the support post to a support;
   an elongated, semicylindrical lower plate having a forward end, a rearward end, a bottom surface, a slot defined therein adjacent the forward end, a flange extending from the bottom surface, and a pair of parallel ears extending upward from the rear end, the flange being pivotally disposed in the clevis;
   an elongated, semicylindrical upper plate member disposed upon the lower plate, the upper plate having a forward end, a rearward end, and a pair of parallel ears extending upward from the forward end, the upper plate member being alternately releasably attached to the lower plate in a forward position and a rear position in order to form an adjustable length cradle adapted for supporting a fishing rod; and
   a socket member pivotally mounted on the lower plate adjacent the rear end, the socket being adapted for slidably receiving a fishing rod grip therein.

10. The fishing rod holder according to claim 9, wherein the upper plate has a notch formed therein adjacent the ears at the forward end, the notch being adapted for supporting a fishing reel.

11. The fishing rod holder according to claim 9, wherein said lower plate and said upper plate each have a slot defined therein adapted for passing a trigger of a pistol grip fishing rod therethrough, the upper plate slot extending beyond the forward end of the lower plate when the upper plate is in the forward position, the slots being aligned when the upper plate is in the rearward position.

* * * * *